United States Patent
Rulkens et al.

(10) Patent No.: US 11,578,171 B2
(45) Date of Patent: Feb. 14, 2023

(54) THERMOPLASTIC COMPOSITION, MOLDED PART MADE THEREOF AND USE THEREOF IN AUTOMOTIVE AND E AND E APPLICATIONS

(71) Applicant: DSM IP Assets B.V., Heerlen (NL)

(72) Inventors: Rudy Rulkens, Echt (NL); Frank Van Der Burgt, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 16/346,269

(22) PCT Filed: Dec. 8, 2017

(86) PCT No.: PCT/EP2017/081964
§ 371 (c)(1),
(2) Date: Apr. 30, 2019

(87) PCT Pub. No.: WO2018/104503
PCT Pub. Date: Jun. 14, 2018

(65) Prior Publication Data
US 2019/0263966 A1    Aug. 29, 2019

(30) Foreign Application Priority Data

Dec. 8, 2016   (EP) .................................... 16202807

(51) Int. Cl.
| C08L 77/06 | (2006.01) |
| C08G 69/26 | (2006.01) |
| C08K 7/06  | (2006.01) |
| C08K 7/14  | (2006.01) |

(52) U.S. Cl.
CPC .............. *C08G 69/265* (2013.01); *C08K 7/06* (2013.01); *C08K 7/14* (2013.01); *C08L 77/06* (2013.01); *C08L 2203/20* (2013.01)

(58) Field of Classification Search
CPC .......... C08G 69/265; C08K 7/06; C08K 7/14; C08L 77/06; C08L 2203/20
See application file for complete search history.

(56) References Cited

U.S. PATENT DOCUMENTS

| 5,270,437 A | 12/1993 | Marks |
| 6,747,120 B2 | 6/2004 | Rulkens |
| 9,080,029 B2 | 7/2015 | Rulken |
| 2009/0130027 A1 | 5/2009 | Shanler et al. |
| 2010/0270577 A1* | 10/2010 | Rulkens ............... C08G 69/265 257/99 |
| 2010/0279550 A1 | 11/2010 | Rulken et al. |
| 2012/0153233 A1* | 6/2012 | Gibon .................... B82Y 30/00 252/506 |
| 2013/0150525 A1* | 6/2013 | Rulkens ................. C08L 77/06 524/607 |
| 2014/0194570 A1 | 7/2014 | Kato et al. |

FOREIGN PATENT DOCUMENTS

| CN | 1384847 | 11/2002 |
| CN | 101772528 | 7/2010 |
| JP | 2011/503209 | 1/2011 |
| WO | 01/25311 | 4/2001 |
| WO | 2013/024593 | 2/2013 |

OTHER PUBLICATIONS

International Search Report for PCT/EP2017/081964, dated Mar. 8, 2018, 3 pages.
Written Opinion of the ISA for PCT/EP2017/081964, dated Mar. 8, 2018, 4 pages.
Volokhina; Solid State Polymerization of XT Salts, Kimicheske Volkna, pp. 30-33 (1964).
Mytara, Angeliki et al; New Aspects on the Direct Solid State Polycondensation (DSSP) of Aliphatic Nylon Salts: The Case of Hexamethylene Diammonium Dodecanoate, Polymers 2021, 13, 2625.

* cited by examiner

*Primary Examiner* — Robert S Jones, Jr.
(74) *Attorney, Agent, or Firm* — Nixon & Vanderhye P.C.

(57) ABSTRACT

The invention relates to a thermoplastic composition comprising (A) a semi-aromatic copolyamide comprising repeat units derived from diamine consisting primarily of tetramethylene diamine and hexamethylene diamine, or pentamethylene diamine and hexamethylene diamine, and dicarboxylic acid consisting primarily of terephthalic acid, having a VN of at least 100 ml/g; and (B) a reinforcing agent. The invention also relates to a plastic part made of the thermoplastic composition. The invention further relates to an automotive vehicle comprising a structural part made of the thermoplastic composition and to an electrical assembly comprising a plastic component made of the thermoplastic composition.

13 Claims, No Drawings

THERMOPLASTIC COMPOSITION, MOLDED PART MADE THEREOF AND USE THEREOF IN AUTOMOTIVE AND E AND E APPLICATIONS

This application is the U.S. national phase of International Application No. PCT/EP2017/081964 filed 8 Dec. 2017, which designated the U.S. and claims priority to EP Patent Application No. 16202807.0 filed 8 Dec. 2016, the entire contents of each of which are hereby incorporated by reference.

The present invention relates to a thermoplastic composition comprising a semi-aromatic copolyamide and a reinforcing agent. The invention also relates to a plastic part made of the thermoplastic composition. The invention further relates to an automotive vehicle comprising a structural part made of the thermoplastic composition and to an electrical assembly comprising a plastic component made of the thermoplastic composition.

Plastic parts made of reinforced thermoplastic compositions are widely used in automotive applications and in electrical and electronic applications. Materials widely used in plastic parts for these applications are reinforced thermoplastic compositions, i.e. thermoplastic compositions comprising a thermoplastic polymer, such as a polyester or a polyamide, and a reinforcing agent. Examples of such polymers are aliphatic polyamides, such as PA-46, semi-crystalline semi-aromatic polyamides based on monomers comprising aromatic monomers such as terephthalic acid and diamines (PPAs), and polycyclohexylenedimethylene terephthalate (PCT), a thermoplastic polyester formed from the polycondensation of terephthalic acid and cyclohexylenedimethanol. State of the art PPAs are described, for example, in WO-2007085406-A1. With PCT based compositions a higher elongation can be reached, for example when using an impact modifier, but typically the tensile strength is lower and the impact resistance remains lower as well, compared to those of similar PPA compositions. A typical solution for increasing the elongation at break is to use impact modifier, but this is typically at the cost of the tensile strength. Vice versa, one may increase the tensile strength, for example by increasing the amount of reinforcing agent, but this generally goes at the cost of the elongation at break, and may further lead to reduction in flow properties resulting in incomplete filing of molds during injection molding, amongst other problems.

In the automotive area, there is a systematic trend in metal parts being replaced by plastic materials. This tends to include metal replacement for engine parts and structural parts close to engine. For such applications, the requirements for several properties, including mechanical properties, such as high tensile strength and impact resistance, become more severe. In the field of electronics plastic components there is a systematic trend towards further miniaturization, resulting in thinner parts, for example section with a thickness of 1 mm or below. Also here the requirements for mechanical properties, in particular the combination of a high tensile strength and a high elongation at break become more critical, in particular for those sections. Herein the plastic component often has sections with a higher thickness to reinforce the component suitably as a support for the thinner sections. When such components are being used in a process for making an assembly of surface mounted electronic components, wherein a plastic component is subjected to a step comprising lead free reflow soldering, occurrence of blistering (see e.g. JEDEC MSL standards, i.e. standards for Moisture sensitivity levels from the Joint Electron Device Engineering Council(s)) should be avoided. Blistering cannot only deteriorate the appearance of a part but also the mechanical integrity. Avoidance of blistering generally appears more difficult for sections with a higher thickness (e.g. 2-3 mm) than for sections with a lower thickness (below 1 mm).

The materials in use nowadays have their limitations with regard to these requirements, and this explains the need for materials having even better properties.

Therefore, it is an aim of the present invention to provide a reinforced thermoplastic composition having improved combination of mechanical properties, more particular showing a combination of a high tensile strength and a high elongation at break, in combination with a high impact strength, compared to those of the cited corresponding PPA and PCT based compositions.

Another aim is to provide a reinforced thermoplastic composition and parts made thereof having improved combinations of mechanical properties, more particular showing a combination of a high tensile strength and a high elongation at break, in combination with a high impact strength, and a reduced susceptibility for blistering compared to those of the cited corresponding PPA and PCT based compositions.

This first aim has been achieved with the thermoplastic composition according to the invention as of claim 1, comprising (A) a semi-aromatic copolyamide, and (B) a reinforcing agent.

A particular embodiment of the invention is directed to a structural part for use in automotive and E&E applications, made of the thermoplastic composition according to the invention as of claim 1.

The second aim has been achieved with a component for an electronic device comprising a molded part made of the composition comprising (A) a semi-aromatic copolyamide as in claim 1, and (B) a reinforcing agent.

A particular embodiment thereof is directed to an electronic device comprising an assembly of components, assembled with surface mounting technology, which have been subjected to a lead-free soldering step.

Herein the semi-aromatic copolyamide (component A) comprises repeat units derived from diamine and dicarboxylic acid, or salts thereof, or any mixtures thereof, wherein a. the diamine (to be understood in this context as the repeat unit derived from the diamine and/or salts thereof) consists of 80-100 mole % of a mixture of tetramethylene diamine and hexamethylene diamine or of 80-100 mole % of a mixture pentamethylene diamine and hexamethylene diamine, and 0-20 mole % of one or more other diamine, wherein the molar % (referred to as mole %) is relative to the total molar amount of diamines;

b. the dicarboxylic acid (to be understood in this context as the repeat unit derived from the dicarboxylic acid and/or salts thereof) consists of 90-100 mole % terephthalic acid, 0-10 mole % of one or more other aromatic dicarboxylic acid and 0-2 mole % aliphatic dicarboxylic acid, wherein the mole % is relative to the total molar amount of dicarboxylic acids;

c. the copolyamide comprises 0-2 mole % of repeat units derived from other monomeric components including 0-0.1 mole % of branching units, wherein the mole % is relative to the total molar amount of diamine, dicarboxylic acid and other monomeric components; and d. the copolyamide has a viscosity number (VN) of at least 100 ml/g.

The effect of the composition according to the invention, comprising the said copolyamide in combination with the reinforcing agent, is that the combination of all three properties, i.e. tensile strength, elongation at break, and impact resistance are improved relative to comparable materials based on the other polymers mentioned above, with the same or similar reinforcing agent package. This is highly surprising, since the effect is also obtained without the use of an impact modifier or changing the amount of reinforcing agent.

The copolyamide in the composition according to the invention has a viscosity number (VN) of at least 100 ml/g. The viscosity number (VN) is herein measured by the method according to ISO 307, fourth edition, at 0.5 wt. % in sulphuric acid. Preferably, the viscosity number (VN) is at least 110 ml/g, more preferably at least 120 ml/g. The advantage of a higher viscosity number (VN) is that both the tensile strength and the elongation at break are further increased.

The semi-aromatic copolyamide used in the composition according to the invention is an essentially linear copolyamide comprising a low amount of branching components, if any at all. Generally, the preparation of high molecular weight polyamides involves the use of branching agents, or occurs as a result of branching components being formed during the polymerization. Often, monofunctional monomers, such as monoamines or mono-carboxylic acid are used in combination with the branching agent, to prevent gelation. The semi-aromatic copolyamide comprises repeat units is derived from diamine and dicarboxylic acid, or salts thereof, or any mixtures thereof. The expression "salts thereof" is to be understood as salts of diamine and salts of dicarboxylic acid. The expression "any mixtures thereof" is to be understood as a mixture of diamine and salts thereof (any one or more salts of diamine) and a mixture of and dicarboxylic acid and salts thereof (any one or more salts of dicarboxylic acid). Accordingly, the semi-aromatic copolyamide used in the composition according to the invention can be prepared with a low amount of monofunctional monomers, if any at all. The semi-aromatic copolyamide used in the present invention can be prepared by direct solid-state polymerization, starting from solid salt components, and optionally further components, while keeping the diamine/dicarboxylic acid (salts) ratio close to 1 during the polymerization. A higher viscosity number (VN) can be obtained by employing longer polymerization times and by using a suitable polycondensation catalyst.

The solid salt components are salts of diamine and dicarboxylic acids. The solid salt components may be salts of tetramethylene diamine, hexamethylene diamine and terephthalic acid, such as tetramethylene diammonium terephthalate and hexamethylene diammonium terephthalate, and optionally further components, or salts of pentamethylene diamine, hexamethylene diamine and terephthalic acid, such as pentamethylene diammonium terephthalate and hexamethylene diammonium terephthalate, and optionally further components.

A semi-aromatic copolyamide comprising primarily based on tetramethylene diamine and hexamethylene diamine and terephthalic acid, thus comprising primarily tetramethylene terephthalate (4T) and hexamethylene terephthalate (6T) repeat units is described in WO200125311. Herein the copolyamide is prepared by a two-step process, wherein in a first step either a melt phase is applied, or an aqueous solution of tetramethylene diamine, hexamethylene diamine, terephthalic acid in water was prepared, heated and flashed, resulting in a formation of a solid product of prepolymer, followed by a second step wherein the prepolymer was further polymerized to obtain the copolyamide. The polymers obtained by the solution method, as described in the examples, have typical RSV numbers of 1.35 and 1.54. The VN numbers of these polyamides are respectively 32 ml/g and 49 ml/g. Though it is mentioned that a higher relative viscosity (higher than for example 2, corresponding to a VN of 90 ml/g) can be obtained by choosing other conditions or a different process, no indications of such conditions are given. Furthermore, reworking experiments as of WO200125311 resulted in polymers with an RSV well below 2.

In WO200125311-A1, it is mentioned that the mechanical properties are well retained at elevated temperature or that the mechanical properties do not decrease too much at a high temperature with different variations in the compositions. The inventors have observed that in the VN range of 50-90 ml/g, more particular 70-90 ml/g, the mechanical properties for tensile strength and elongation at break hardly vary, whereas with the compositions according to the invention there is a significant improvement in mechanical properties.

The diamine preferably consists of 90-100 mole % of the mixture of tetramethylene diamine and hexamethylene diamine, or 90-100 mole % of the mixture of pentamethylene diamine and hexamethylene diamine, as the main diamine constituents, and 0-10 mole % of the one or more other diamine, relative to the total molar amount of diamines. More preferably, the mixture of tetramethylene diamine and hexamethylene diamine is used for the main diamine constituents and the combined amount of thereof is in the range of 95-100 mole %, and the amount of the one or more other diamine is in the range of 0-5 mole %, relative to the total molar amount of diamines. A lower amount of other diamine has the advantage that better mechanical properties are achieved.

The other diamine herein can be any diamine that can be copolymerized together with tetramethylene diamine and hexamethylene diamine and terephthalic acid, respectively with pentamethylene diamine and hexamethylene diamine and terephthalic acid. The type and amount of such other diamines are suitably optimized to retain the mechanical properties as high as desirable. Examples of suitable diamines that can be copolymerized together with tetramethylene diamine and hexamethylene diamine and terephthalic acid are pentamethylene diamine and linear aliphatic diamines H2N(CH2)xNH2 with x=7-24. Examples of suitable diamines that can be copolymerized together with pentamethylene diamine and hexamethylene diamine and terephthalic acid are tetramethylene diamine and linear aliphatic diamines H2N(CH2)xNH2 with x=7-24. Further other diamines that may be copolymerized with either of the two mixtures of main diamine constituents, include aromatic diamines, cyclo-aliphatic diamines and branched diamines. Examples thereof are metaxylylene diamine, isophoronediamine, 2-methylpentamethylenediamine and trimethylhexamethylenediamine. Aromatic diamines, cyclo-aliphatic diamines and branched diamines are preferably used in a combined amount of less than 5 mole %, preferably 0-3 mole %, if used at all.

In the thermoplastic composition according to the invention, the diamine preferably comprises tetramethylene diamine and hexamethylene diamine as the main diamine constituents. Herein the diamine suitably comprises tetramethylene diamine and hexamethylene diamine in a molar ratio in a range of 15:85-70:30, preferably in the range of 20:80-60:40, and more preferably in the range of 30:70-50:50. The advantage thereof is that the compositions show even better melt processing.

Analogously, the copolyamide in the thermoplastic composition according to the invention comprises tetramethylene terephthalamide units (4T) and hexamethylene terephthalamide units (6T) in a molar ratio in a range of 15:85-70:30, preferably 20:80-60:40, and more preferably in the range of 30:70-50:50.

The aromatic dicarboxylic acid in the copolyamide comprises predominantly terephthalic acid. Preferably, the aromatic dicarboxylic acid comprises at least 95 mole %, preferably 98-100 mole %, of terephthalic acid, relative to the total molar amount of dicarboxylic acids. The effect thereof is that the composition has a higher stiffness at high temperature, while elongation at break remains at a good level.

In another preferred embodiment of the invention, the aromatic dicarboxylic acid consists of 95-100 mole % terephthalic acid, 0-5 mole % of one or more other aromatic dicarboxylic acid and 0-1 mole % aliphatic dicarboxylic acid, relative to the total molar amount of dicarboxylic acids.

In a further preferred embodiment, the copolyamide consists of repeat units derived from 95-100 mole % of tetramethylene diamine, hexamethylene diamine and terephthalic acid, and 0-5 mole % of other monomers, relative to the total amount of tetramethylene diamine, hexamethylene diamine, terephthalic acid and other monomers.

The thermoplastic composition according to the invention suitably comprises
(A) 30-90 wt. % of the semi-aromatic copolyamide, and
(B) 10-70 wt. % of the reinforcing agent
wherein the weight percentages (wt. %) are relative to the total weight of the composition.

Preferably, thermoplastic composition comprises
(A) 40-80 wt. % of the semi-aromatic copolyamide, and
(B) 20-60 wt. % of the reinforcing agent;
wherein the weight percentages (wt. %) are relative to the total weight of the composition.

The reinforcing agent in the composition may be any usual filler or fiber used for reinforcing thermoplastic polymer compositions. Herein a wide range of fibers and fillers may be used. Examples of such fillers include, but are not limited to, silica, metasilicates, alumina, talc, diatomaceous earth, clay, kaolin, quartz, glass, mica, titanium dioxide, molybdenum disulphide, gypsum, iron oxide, zinc oxide, powdered polytetrafluoroethylene, montmorillonite, calcium carbonate, glass powder and glass beads. For the reinforcing fibers, for example, aromatic fibers as well as inorganic fibers may be used. Preferably, inorganic fibers are used. Examples thereof are glass fibers, carbon fibers, boron fibers, ceramic fibers and whiskers of wollastonite and potassium titanate.

Preferably, the reinforcing agent comprises or even consists of glass fibers, or carbon fibers, or a combination thereof. More preferably glass fibers are used. These glass fibers may be of various composition and shape, for example, S-glass, E-glass and basalt glass, as well as round glass and flat glass fibers.

In one embodiment of the invention, the composition comprises or even consists of:
(A) 30-90 wt. %, preferably 40-80 wt. %, of the semi-aromatic copolyamide according to the present invention, and
(B) 10-70 wt. %, preferably 20-60 wt. %, of inorganic fillers, or inorganic fibers, or a combination thereof;
wherein the weight percentages (wt. %) are relative to the total weight of the composition.

In another embodiment, the composition comprises or even consists of:
(A) 30-90 wt. %, preferably 40-80 wt. %, of the semi-aromatic copolyamide according to the present invention, and
(B) 10-70 wt. %, preferably 20-60 wt. %, of glass fibers, or carbon fibers, or a combination thereof;
wherein the weight percentages (wt. %) are relative to the total weight of the composition.

The thermoplastic composition according to the invention may optionally contain one or more further component, next to the copolyamide and the reinforcing filler. Suitably, such further component or components are selected from the usual additives, for example stabilizers, colorants, processing aids, for example mold release agents and lubricants, agents for improving impact resistance and flame retardants. This thermoplastic composition containing the copolyamide may optionally also contain polymers other than polyamides. However, the amount thereof is preferably limited, in order not to deteriorate the mechanical properties.

Suitably, the amount of one or more further component is in the range of 0-30 wt. %, preferably 0-20 wt. %, relative to the total weight of the composition. The amount of other polymers is suitably in the range of 0-15 wt. %, preferably 0-10 wt. %, more preferably 0-5 wt. %, relative to the total weight of the composition.

The thermoplastic composition according to the invention has eminent mechanical properties, which contribute to better performance of molded parts made thereof in various applications. Preferably, the composition has a Tensile Strength (TS) of at least 200 MPa, more preferably at least 210 MPa, or an Elongation at Break (EaB) of at least 2.3%, more preferably at least 2.5%, or any combination thereof. Herein the TS and EaB are measured by the method according to ISO 527/1 at 23° C. at a drawing speed of 5 mm/min, on test bars conforming ISO 527 type 1A and having a thickness of 4 mm.

The thermoplastic composition according to the invention is eminently suitable for forming products from the melt, in particular by means of injection-molding. Products obtained by using the plastic composition according to the invention are for example car parts, and electric and electronic components. The molded part is advantageously a structural part for an automotive vehicle or an electronic device, or a plastic component for an electrical assembly.

Examples of structural parts for use in an automotive vehicle are engine mount, structural oil pan, shift fork, transmission bridge, thermal management module, crank shaft cover, timing chain cover, bearing cage Examples of structural parts for use in an electronic device are housings, frames, middle frames and stiffeners, for example for laptops and cellphones.

Specifically, structural parts for use in electrical and electronics parts are connectors, terminal blocks, pin headers, lead frames, switches, relays, capacitors, resistors, camera modules, In general, plastics components as part of electronics components which are assembled on a printed circuit board (PCB) with lead free reflow soldering process.

Examples of plastic component for an electrical assembly are connectors, such as connectors used in automotive applications, connectors and other parts which have to be conducted through a reflow process.

The present invention also relates to a molded plastic part made of (to be understood in this context as consists of) a thermoplastic composition according to the invention, or any particular or preferred embodiment thereof. The advantages thereof are those described above for the thermoplastic composition mentioned above. Preferably, the molded plastic part is a structural part for an automotive vehicle or a plastic component for an electrical assembly, more preferably a plastic component having a section with a thickness of at least 1.6 mm. The advantage of such latter component is that it has improved blistering resistance in a lead soldering process, despite the presence of thicker sections.

The invention also relates to an automotive vehicle, comprising a structural part according to the invention. The effect thereof is improved mechanical properties as mentioned above. A further advantage is that the high temperature mechanical properties do not deteriorate as would be the case with impact modifiers, while the structural parts still have a high strength and high elongation.

The invention also relates to an electronic device, comprising a housing, a frame or a stiffener made of (to be understood in this context as consists of) the composition according to the invention. The electronic device is, for example, a laptop or a cellphone. The advantage is that the electronic device is better protected against damage, because of the better mechanical properties and improved impact resistance.

The invention further relates to an assembly of surface mounted electronic components, comprising a plastic component made according to the invention. The advantage thereof is not only that the plastic component has improved mechanical properties as mentioned above, but also improved blister performance. This improved blister performance is in particular important for plastic components having a section with a higher thickness, when subjected to an assembly process comprising a lead free reflow soldering step.

A preferred embodiment thereof concerns an assembly, wherein the plastic component has a section having a thickness of at least 1.6 mm.

The invention also relates to a process for making an assembly of surface mounted electronic components, wherein a plastic component according to the invention, or any preferred or particular embodiment thereof, is subjected to a step comprising lead free reflow soldering.

The invention is further illustrated with the following examples and comparative experiments.

Test Methods
Mechanical Testing

The mechanical properties of tensile strength, elongation at break and tensile modulus were determined in a tensile test according to ISO 527/1 at 23° C. at a drawing speed of 5 mm/min, according to ISO 527. Herein test bars conforming conforming ISO 527 type 1A and having a thickness of 4 mm were used.

Blistering Performance Under Reflow Soldering Conditions.

For the blistering performance under reflow soldering conditions a large number of samples were conditioned in a humidifying cabinet at a preset temperature and humidity level. For the examples according to the present invention, the follow conditioning is used: 168 hours at 85° C. and 85% Relative Humidity (RH). This conditioning was done in a climate chamber. At different time intervals, individual samples (in lots of 10) were taken from the cabinet, shortly cooled at ambient conditions to room temperature, put in a reflow oven and subjected to temperature conditions as applied in reflow soldering processes. Samples are conducted to the reflow profile within one hours after coming out of the preconditioning. A so-called Sony reflow profile was used. A typical temperature profile applied was the following. First the samples were preheated with a heating ramp of average 1.5° C./sec to reach a temperature of 140° C. after 80 seconds, after which the sample was heated more gradually to reach a temperature of 160° C. after 160 seconds from the start. Then, the sample was heated either to 260° C. or 270° C. (two different sets of experiments carried out at two different temperatures) with an initial heating ramp of about 6° C./seconds to reach a temperature of 220° C. after 240 seconds and a more gradual heating rate of 2° C./sec to reach a temperature of 260° C. (or 270° C.) after 290 sec from the start. After that, the sample was cooled down to 140° C. in 30 seconds. Then the 10 samples were taken from the oven, let cool to room temperature and inspected for the presence of blisters. For each condition period in the humidifying cabinet the percentage of samples that showed occurrence of blistering was rated. The percentage of samples with blisters was recorded. For each thickness, the reflow process was separately calibrated for both 260 and 270° C. as max temperature, calibration occurred using thermocouples both on the plastic as well as on the PCB (very near to the plastic part (connector) where the temperature of the PCB is leading for the temperature profile. Reflow can be performed on small plaques or connectors, different parts with different thicknesses can be used. Temperatures were measured on the sample and on the PCB. This process can be done both with a maximum temperature of 260° C. or 270° C. and has to be performed within one hour after conditioning. The humidifying conditions prior to reflow soldering are 168 hours at 85° C. and 85% RH (relative humidity), this conditioning is done in a humidifying chamber.

Determination of the Viscosity Number

The measurement was performed according to ISO 307, fourth edition. For the measurement a pre-dried polymer sample was used, the drying of which was performed under high vacuum (i.e. less than 50 mbar) at 80° C. during 24 hrs. Determination of the relative viscosity was done at a concentration of 0.5 gram of polymer in 100 ml of sulphuric acid 96.00±0.15% m/m solvent at 25.00±0.05° C. The flow time of the solution (t) and the solvent (to) were measured using a DIN-Ubbelohde from Schott (ref. no. 53020) at 25° C.

The viscosity number was calculated as follows:

$$VN = \frac{\left(\frac{t}{t_0} - 1\right)}{c} = \left(\frac{t}{t_0} - 1\right) * 200$$

wherein:
VN=viscosity number (in mL/g)
t=average flow time of the sample solution, in seconds
$t_0$=average flow time of the solvent, in seconds
c=concentration, g/mL (=0.005)

Raw Materials

| | |
|---|---|
| PCT | ThermX CG033: 30% glass fiber reinforced polycyclohexylene-dimethylene terephthalate for injection molding (ex Ticona) |
| PCT + IM | ThermX CGT033 30% glass fiber reinforced impact modified polycyclohexylenedimethylene terephthalate for injection molding (ex Ticona) |
| PA-1 | PA-4T/6T/46 copolymer (ex DSM) |

Other Materials:
Preparation PA-2 (PA-4T/6T Copolymer)

A 50 liter tumble drier was charged with 15 kg of 4T/6T salt (39/61 mole/mole). The tumble drier was evacuated to 50 mbar and filed with nitrogen and repeating this 5 times. The mixture was heated in 5 hours to a temperature of 220° C. and subsequently in 15 hours to 255° C. while allowing reaction water to leave the tumble drier. A low nitrogen purge was used during the reaction. The mixture was cooled to 235° C. in 19 hours and a mix of 650 g 1,6-hexamethylenediamine, 300 g 1,4-butanediamine and 1.0 kg of water was added during 7 hours, while keeping the temperature at 235° C. The mix was reacted another 29 hours at 235°. Then the nitrogen stream was increased and the material cooled to room temperature. A white powder was obtained.

Preparation PA-3 (PA-4T/6T Copolymer)

A 50 liter tumble drier was charged with 15 kg of 4T/6T salt (39/61) and 0.015 kg of sodiumhypophoshphitemonohydrate. The tumble drier was evacuated to 50 mbar and filed with nitrogen and repeating these steps 5 times. The mixture was heated in 5 hours to a temperature of 220° C. and subsequently in 15 hours to 255° C. while allowing reaction water to leave the tumble drier. A low nitrogen purge was used during the reaction. The mixture was cooled to 235° C. in 19 hours and a mix of 650 g 1,6-hexamethylenediamine, 300 g 1,4-butanediamine and 1.0 kg of water was added during 7 hours, while keeping the temperature at 235° C. The mix was reacted another 29 hours at 235°. Then the nitrogen stream was increased and the material cooled to room temperature. The polymer was obtained as a white powder.

Preparation PA-4 (PA-4T/6T Copolymer)

Preparation of PA-4 was repeated, except that the 29 hours reaction time before starting the cooling was increased to 39 hours. The polymer was obtained as a white powder.

Compounding: Preparation of Glass Fiber Reinforced Polyamide Compositions

Polyamide compositions, based on PA-1, PA-2, PA-3 and PA-4 in combination with 30 wt. % glass fibers were prepared on a twin-screw extruder, employing standard molding conditions. Herein, the temperature of the extruded melt was typically about 350-360° C. After the melt compounding the resulting melt was extruded into strands, cooled and cut into granules.

Injection Molding—Preparation of Test Bars for Mechanical Testing and Blistering Tests The polyamide compositions described above were used for making injection molded parts. For injection molding the materials were pre-dried prior to use, by applying the following conditions: the copolyamides were heated under vacuum of 0.02 MPa to 150° C. and kept at that temperature and pressure for 12 hours while a stream of nitrogen was passed. The pre-dried materials were injection molded on an Arburg 5 injection molding machine with a 22 mm screw diameter. Herein the temperature of the cylinder wall was set at 345° C., and the temperature of the mold was set at 140° C.

For the test bars for mechanical testing, a mold conforming ISO 527 type 1A was used. The thickness of the test bars was 4 mm.

For testing the blistering performance under reflow soldering conditions test bars were used which were prepared by injection using a Campus UL injection mould. Herein Campus UL bars with different thickness as needed for further tests were prepared.

The compositions for Comparative Experiments A-D and Examples I and II, and the test results for the mechanical properties have been collected in Table 1. The results for the blistering in the reflow soldering simulation tests have been collected in Table 2.

TABLE 1

Compositions and mechanical properties (TM = tensile modulus; TS = tensile Strength; EaB = elongation at break)

|  | CE-A | CE-B | CE-C | CE-D | EX-I | EX-II |
|---|---|---|---|---|---|---|
| Polymer-type | PCT | PCT + IM | PA-1 | PA-2 | PA-3 | PA-4 |
| VN (ml/g) |  |  | 120 | 75 | 103 | 113 |
| Polymer (wt. %) | 70 | 70 | 70 | 70 | 70 | 70 |
| GF (wt. %) | 30 | 30 | 30 | 30 | 30 | 30 |
| TM [MPa] | 8500 | 8400 | 11000 | 11300 | 10650 | 10500 |
| TS [Mpa] | 120 | 116 | 190 | 173 | 210 | 220 |
| EaB [%] | 2 | 2.8 | 2.2 | 1.9 | 2.6 | 2.9 |
| Charpy [kJ/m2] Unnotched | 50 | 55 | 60 |  |  | 70 |

The above results show that compositions according to the invention (EX-I and EX-II) combine a high elongation-at-break (EaB) with a high tensile strength and high impact strength. The EaB is comparable to that of CE-B (based on impact modified PCT) while having much higher TS and IR. Compared to CE-C (PPA-1) and CE-D, both EX-I and EX-II have a higher TS, EaB and impact strength. More particular, the properties of EX-1 are much better than those of CE-C; whereas the compositions of these two copolyamides are different, these have about the same viscosity number.

TABLE 2

Reflow results after conditioning for 168 hrs at 85° C./85% RH (blistering behavior after reflow; failure rate in percentage of test bars showing blisters: 0% is 0% blisters, all passed; 100% is 100% blisters, all failed)

|  | Reflow at Tmax = 260° C. | | | | Reflow at Tmax = 270° C. | | | |
|---|---|---|---|---|---|---|---|---|
| Thickness | CE-C | CE-B | EX-I | EX-II | CE-C | CE-B | EX-I | EX-II |
| 0.4 mm | 0% | 0% | 0% | 0% | 0% | 0% | 0% | 0% |
| 0.8 mm | 0% | 0% | 0% | 0% | 0% | 0% | 0% | 0% |
| 1.2 mm | 0% | 0% | 0% | 0% | 100% | 100% | 0% | 0% |
| 1.6 mm | 100% | 20% | 0% | 0% | 100% | 100% | 0% | 0% |
| 2.2 mm | 100% | 100% | 0% | 0% | 100% | 100% | 0% | 0% |
| 3.2 mm | 100% | 100% | 0% | 0% | 100% | 100% | 80% | 0% |

The above results show that the compositions according to the invention (EX-I and EX-II) show a significantly improved blister behavior and comply with JEDEC requirements (Sony profile Tmax 260° C./270° C.; after conditioning for 168 hrs at 85° C./85% RH) over the whole thickness range of 0-3.2 mm. This in contrast with Comparative Experiments C and B, which fail in all tests above 1.2 mm sample thickness. With the test carried out with Tmax 270° C., EX-I only becomes critical at the highest thickness of 3.2 mm, whereas EX-II still passes over the whole range. Under these conditions CE-B and CE-C already fail above 0.8 mm thickness. Moreover, CE-B already showed partial melting.

The invention claimed is:
1. A thermoplastic composition comprising:
(A) a semi-aromatic copolyamide; and
(B) a reinforcing agent, wherein
the semi-aromatic copolyamide (A) is a direct solid-state polymerization (DSSP) product at a temperature of 235-255° C. of and comprises repeat units derived from monomeric components of:

(a) diamines which consist of, relative to the total molar amount of diamines:
   90-100 mole % of a mixture of tetramethylene diamine and hexamethylene diamine, or
   90-100 mole % of a mixture of pentamethylene diamine and hexamethylene diamine, and
   0-10 mole % of one or more other diamine;
(b) dicarboxylic acids which consist of, relative to the total molar amount of dicarboxylic acids:
   95-100 mole % terephthalic acid,
   0-5 mole % of one or more other aromatic dicarboxylic acid, and
   0-1 mole % aliphatic dicarboxylic acid; and
(c) at least one other monomeric component which includes 0-0.1 mole %, relative to the total molar amount of the monomeric components (a)-(c), of branching units; and wherein
the copolyamide has a viscosity number (VN) of at least 100 ml/g; measured by the method according to ISO 307, fourth edition, at 0.5 wt. % in sulphuric acid at 25° C.

2. The thermoplastic composition according to claim 1, wherein the diamine comprises tetramethylene diamine and hexamethylene diamine in a molar ratio in a range of 15:85-70:30.

3. The thermoplastic composition according to claim 1, wherein the copolyamide consists of repeat units derived from 95-100 mole % of tetramethylene diamine, hexamethylene diamine and terephthalic acid, and 0-5 mole % of one or more other monomers, relative to the total amount of tetramethylene diamine, hexamethylene diamine, terephthalic acid and other monomers.

4. The thermoplastic composition according to claim 1, wherein the composition comprises
(A) 30-90 wt. % of the semi-aromatic copolyamide, and
(B) 10-70 wt. % of the reinforcing agent; wherein the weight percentages (wt. %) are relative to the total weight of the composition.

5. The thermoplastic composition according to claim 1, wherein the composition comprises
(A) 30-90 wt. % of the semi-aromatic copolyamide, and
(B) 10-70 wt. % of glass fibers, or carbon fibers, or a combination thereof; wherein
the weight percentages (wt. %) are relative to the total weight of the composition.

6. The thermoplastic composition according to claim 1, wherein the composition comprises one or more further components.

7. The thermoplastic composition according to claim 1, wherein
the viscosity number (VN) is at least 110 ml/g, the Tensile Strength is at least 200 MPa, Elongation at Break (EaB) is at least 2.3% or any combination thereof, and wherein
the viscosity number (VN) is measured by the method according to ISO 307, fourth edition, at 0.5 wt. % in sulphuric acid at 25° C.; and
the Tensile Strength and Elongation at Break are measured by the method according to ISO 527/1 at 23° C. at a drawing speed of 5 mm/min, on test bars conforming to ISO 527 type 1A and having a thickness of 4 mm.

8. A molded plastic part made of a thermoplastic composition as defined in claim 1.

9. The molded part according to claim 8, wherein the molded part is a structural part for an automotive vehicle or a plastic component for an electrical assembly.

10. An automotive vehicle comprising the structural part according to claim 9.

11. An electronic device comprising an assembly of surface mounted electronic components, wherein at least one of the surface mounted electronic components includes the molded plastic part according to claim 8.

12. The electronic device according to claim 11, wherein the molded plastic part has at least one section having a thickness of at least 1.6 mm.

13. A process for making an assembly of surface mounted electronic components, wherein the process comprises subjecting the plastic component as defined in claim 9 to a process step comprising lead free reflow soldering.

* * * * *